United States Patent
Ono

(10) Patent No.: US 8,626,242 B2
(45) Date of Patent: Jan. 7, 2014

(54) ADAPTIVE ARRAY ANTENNA AND WIRELESS COMMUNICATION APPARATUS INCLUDING ADAPTIVE ARRAY ANTENNA

(75) Inventor: Takeshi Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 148 days.

(21) Appl. No.: 13/256,484

(22) PCT Filed: Nov. 2, 2010

(86) PCT No.: PCT/JP2010/006450
§ 371 (c)(1),
(2), (4) Date: Sep. 14, 2011

(87) PCT Pub. No.: WO2011/052238
PCT Pub. Date: May 5, 2011

(65) Prior Publication Data
US 2012/0003946 A1    Jan. 5, 2012

(30) Foreign Application Priority Data
Nov. 2, 2009   (JP) ................................ 2009-251685

(51) Int. Cl.
*H04M 1/00*    (2006.01)
*H01Q 19/10*   (2006.01)
*H04W 16/28*   (2009.01)
*H01Q 1/24*    (2006.01)

(52) U.S. Cl.
CPC ............... *H04W 16/28* (2013.01); *H01Q 1/246* (2013.01)
USPC ..................... 455/562.1; 455/575.7; 455/272; 455/276.1; 343/818; 343/833; 343/836

(58) Field of Classification Search
USPC ......... 455/562.1, 575.7, 272, 276.1; 343/817, 343/818, 833, 834, 836
See application file for complete search history.

(56) References Cited

U.S. PATENT DOCUMENTS 4,924,235 A * 5/1990 Fujisaka et al. ............... 342/374
5,767,807 A * 6/1998 Pritchett ....................... 342/374

(Continued)

FOREIGN PATENT DOCUMENTS

| JP | 06-283924 | 10/1994 |
|---|---|---|
| JP | 2000-223926 | 8/2000 |

(Continued)

OTHER PUBLICATIONS

International Search Report issued Feb. 8, 2011 in International (PCT) Application No. PCT/JP2010/006450.

(Continued)

*Primary Examiner* — Duc M Nguyen
(74) *Attorney, Agent, or Firm* — Wenderoth, Lind & Ponack, LLP

(57) ABSTRACT

To provide an adaptive array antenna capable of increasing resolution of a variable beam direction of the antenna without increasing a calculation amount in arithmetic processing unit for optimally controlling a variable phase shifter. A parasitic element-equipped adaptive array antenna (100) includes n (n is an integer equal to or greater than 2) parasitic antenna elements ($101_1$ to $101_n$), (n−1) fed antenna elements ($102_1$ to $102_{n-1}$) which are coupled to the parasitic antenna elements ($101_1$ to $101_n$) by electromagnetic fields, and (n−1) variable phase shifters ($104_1$ to $104_{n-1}$) which change the phases of radio frequency signals to be supplied to the respective fed antenna elements ($102_1$ to $102_{n-1}$). Each of the fed antenna elements ($102_1$ to $102_{n-1}$) is arranged astride at least two of the parasitic antenna elements ($101_1$ to $101_n$).

2 Claims, 5 Drawing Sheets

(56) References Cited

U.S. PATENT DOCUMENTS

| | | | |
|---|---|---|---|
| 6,069,586 A * | 5/2000 | Karlsson et al. | 343/700 MS |
| 6,133,882 A * | 10/2000 | LaFleur et al. | 343/700 MS |
| 6,788,268 B2 * | 9/2004 | Chiang et al. | 343/850 |
| 7,061,431 B1 | 6/2006 | Tonn | |
| 7,068,234 B2 * | 6/2006 | Sievenpiper | 343/745 |
| 7,202,818 B2 * | 4/2007 | Anguera Pros et al. | 343/700 MS |
| 7,557,761 B2 | 7/2009 | Iwai et al. | |
| 2001/0031648 A1 * | 10/2001 | Proctor et al. | 455/562 |
| 2002/0036586 A1 * | 3/2002 | Gothard et al. | 342/374 |
| 2004/0036651 A1 * | 2/2004 | Toda | 342/383 |
| 2005/0057422 A1 | 3/2005 | Deguchi et al. | |
| 2008/0174508 A1 | 7/2008 | Iwai et al. | |

FOREIGN PATENT DOCUMENTS

| | | |
|---|---|---|
| JP | 2001-244727 | 9/2001 |
| JP | 2004-242168 | 8/2004 |
| JP | 2007-006215 | 1/2007 |
| JP | 2007-135186 | 5/2007 |
| JP | 2008-061030 | 3/2008 |
| JP | 2008-199588 | 8/2008 |
| JP | 2008-199666 | 8/2008 |

OTHER PUBLICATIONS

"*Antenna Engineering Handbook*", Publisher: Ohmsha, Ltd., Published on Oct. 30, 1980, p. 226, right column, $3^{rd}$ line from the bottom to p. 227, left column, last line.

* cited by examiner

ADAPTIVE ARRAY ANTENNA AND WIRELESS COMMUNICATION APPARATUS INCLUDING ADAPTIVE ARRAY ANTENNA

TECHNICAL FIELD

The present invention relates to a parasitic element-equipped adaptive array antenna and to a wireless communication apparatus including the parasitic element-equipped adaptive array antenna.

BACKGROUND ART

Conventionally, in wireless communication in a microwave band and a millimeter waveband, in order to improve quality of communication, high-gain antennas using multiple antennas and multiple wireless circuits are often used. When a high-gain antenna is used, the received power at the receiving side increases and communication distance can be relatively increased.

Here, the configuration of a conventional, typical n-parasitic element-equipped adaptive array antenna 500 shall be described using FIG. 5. It should be noted that FIG. 5 is a diagram showing the configuration of a conventional, typical n-parasitic element-equipped adaptive array antenna.

In FIG. 5, an example of an array antenna including n elements is shown, and the antenna 500 includes parasitic antenna elements $501_1$ to $501_n$, fed antenna elements $502_1$ to $502_n$, feeder lines $503_1$ to $503_n$, and variable phase shifters $504_1$ to $504_n$.

Each of the variable phase shifters $504_1$ to $504_n$ is connected to a corresponding one of the feeder lines $503_1$ to $503_n$, and changes the phase of a radio frequency signal transmitted through the corresponding one of the feeder lines $503_1$ to $503_n$ into an appropriate phase.

The feeder lines $503_1$ to $503_n$ are designed to have a matching characteristic impedance with the wireless communication apparatus (not shown in the figure) to which the antenna 500 is connected, and are connected to the fed antenna elements $502_1$ to $502_n$ so as to supply power thereto.

Each of the parasitic antenna elements $501_1$ to $501_n$ is provided so as to have the same central axis as a corresponding one of the fed antenna elements $502_1$ to $502_n$, and the corresponding ones of the fed antenna elements $502_1$ to $502_n$ and parasitic antenna elements $501_1$ to $501_n$ are coupled by an electromagnetic field. By changing the respective phases to be changed by the n-system variable phase shifters $504_1$ to $504_n$, the phases of the electric fields that are excited at the n-system parasitic antenna elements $501_1$ to $501_n$ and fed antenna elements $502_1$ to $502_n$ are individually changed, and radiation pattern of the array antenna is changed.

In this manner, providing parasitic elements in the antenna elements has the advantages of widening the bandwidth and increasing gain, and there are cases where these are used in an array antenna such as that shown in FIG. 5. However, as disclosed in Patent Literature 1 (PTL 1), generally, a fed element and a parasitic element are often arranged so as to have the same central axis in order to increase the coupling intensity between the fed element and the parasitic element.

Furthermore, Patent Reference 2 (PTL 2) discloses a technique of multi-layering parasitic elements and widening the space between the elements to obtain a wide opening area using a small number of fed elements and increase gain.

However, since there is a tradeoff between antenna gain and beam width, the range of the wireless communication angle is narrowed down when attempting to increase the gain of the antenna. In order to compensate for this, a widely used technique is that of an adaptive array antenna (phased array antenna) which is provided with a variable phase shifter in each antenna element, and which changes the beam direction by changing the phases to be changed by the variable phase shifters.

CITATION LIST

Patent Literature

[PTL 1] Japanese Unexamined Patent Application Publication No. 2000-223926
[PTL 2] Japanese Unexamined Patent Application Publication No. 2004-242168

SUMMARY OF INVENTION

Technical Problem

However, in a conventional adaptive array antenna which performs digital beam forming electronically, the resolution of the phases to be changed is determined by the number of bits for controlling the respective variable phase shifters, and thus it is necessary to increase the number of control bits of the variable phase shifters in order to increase the resolution of the beam direction of the adaptive array antenna. However, simply increasing the number of control bits leads to an increase in the amount of calculations for optimally controlling the variable phase shifters, that is, an increase in the calculation time. As such, the conventional adaptive array antenna has the problem of the tradeoff between the resolution of the variable beam direction of the adaptive array antenna and the amount of calculation in its arithmetic processing unit.

The present invention is conceived in view of such a problem and has as an object to provide (i) an adaptive array antenna capable of increasing the resolution of the variable beam direction of the adaptive array antenna without increasing the amount of calculation in the arithmetic processing unit and (ii) a wireless communication apparatus including the adaptive array antenna.

Solution to Problem

In order to achieve the aforementioned object, the adaptive array antenna according to an aspect of the present invention includes at least one variable phase shifter which changes a phase of an electrical signal; a plurality of parasitic antenna elements; and a plurality of fed antenna elements each of which (i) is arranged astride at least two parasitic antenna elements out of the plurality of parasitic antenna elements, (ii) is coupled with the at least two parasitic antenna elements by an electromagnetic field, (iii) receives a supply of the electrical signal phase-changed by the at least one variable phase shifter and (iv) transmits, to the at least two parasitic antenna elements, an electric field generated based on the supplied electrical signal.

With this, each of the parasitic antenna elements receives power from the fed antenna elements, and the excitation electric field thereof is dependent on the composite electric field obtained by the electromagnetic coupling with the fed antenna elements. The phase of the composite electric field takes the value of the types corresponding to the number of combinations of the variable phases that are possible for the fed antenna elements. Therefore, compared to the conventional adaptive array antenna in which one fed antenna element is provided for one parasitic antenna element, according to the adaptive array antenna according to the present invention, the types of the phases to be excited at the parasitic antenna elements increases without increasing the resolution of the phase control for the respective fed antenna elements.

Here, it is preferable that each of the fed antenna elements be arranged at a position that is equidistant from at least two parasitic antenna elements. With this, each one of the parasitic antenna elements is electromagnetically coupled with the fed antenna elements located at equidistant positions, and thus phase control for each of the fed antenna elements is simplified.

Here, it is preferable that the parasitic antenna elements be arranged on a plane different from a plane on which the fed antenna elements are arranged. Accordingly, it is possible to realize a parasitic element-equipped adaptive array antenna having a simple structure in which parasitic antenna elements are formed on a first substrate and fed antenna elements are formed on a second substrate.

Furthermore, the adaptive array antenna may include: n parasitic antenna elements as the parasitic antenna elements, n being an integer equal to or greater than 2; (n−1) fed antenna elements as the fed antenna elements; and (n−1) variable phase shifters as the at least one variable phase shifter, the (n−1) variable phase shifters being provided to correspond one-to-one to the (n−1) fed antenna elements, and each of the (n−1) variable phase shifters shifting a phase of a radio frequency signal supplied to the corresponding one of the (n−1) fed antenna elements, wherein each of the (n−1) fed antenna elements is arranged astride two adjacent parasitic antenna elements out of the n parasitic antenna elements.

With this, each of the parasitic antenna elements receives a power feed from the two adjacent fed antenna elements, and the excitation electric field thereof is dependent on the composite electric field obtained by the electromagnetic coupling with the two adjacent fed antenna elements. The phase of the composite electric field is expressed by the average of the phases of the coupled electric fields from the two adjacent fed antenna elements, and can take the value of the types corresponding to the number of combinations of the variable phases that are possible for the two fed antenna elements. Therefore, compared to the conventional adaptive array antenna in which one fed antenna element is provided for one parasitic antenna element, according to the adaptive array antenna according to the present invention, the types of the phases to be excited at the parasitic antenna elements increases without increasing the resolution of the phase control for the respective fed antenna elements.

Furthermore, the adaptive array antenna may include: n×m parasitic antenna elements as the parasitic antenna elements, n being an integer equal to or greater than 2, and m being an integer equal to or greater than 2; (n−1)×(m−1) fed antenna elements as the fed antenna elements; and (n−1)×(m−1) variable phase shifters as the at least one variable phase shifter, the (n−1)×(m−1) variable phase shifters being provided to correspond one-to-one to the (n−1)×(m−1) fed antenna elements, and each of the (n−1)×(m−1) variable phase shifters shifting a phase of a radio frequency signal supplied to the corresponding one of the (n−1)×(m−1) fed antenna elements, wherein each of the (n−1)×(m−1) fed antenna elements is arranged astride four adjacent parasitic antenna elements out of the n×m parasitic antenna elements.

With this, each of the parasitic antenna elements receives a power feed from the four adjacent fed antenna elements, and the excitation electric field thereof is dependent on the composite electric field obtained by the electromagnetic coupling with the four fed antenna elements. The phase of the composite electric field is expressed by the average of the phases of the coupled electric fields from the four adjacent fed antenna elements, and can take the value of the types corresponding to the number of combinations of the variable phases that are possible for the four fed antenna elements. Therefore, compared to an adaptive array antenna in which one fed antenna element is provided between two parasitic antenna elements, according to the adaptive array antenna according to the present invention, the types of the phases to be excited at the parasitic antenna elements further increases.

Furthermore, in order to achieve the aforementioned object, the wireless communication apparatus according to an aspect of the present invention includes: the above-described adaptive array antenna; a communication quality detection unit configured to detect a wireless communication quality level; an arithmetic processing unit configured to perform calculation for determining a phase control signal for controlling a phase to be changed by the at least one variable phase shifter included in the adaptive array antenna so that the wireless communication quality level detected by the communication quality detection unit is at a level suited for a predetermined wireless communication; and a phase control unit configured to control the phase to be changed by the at least one variable phase shifter, based on a result of the calculation by the arithmetic processing unit.

With this, it is possible to realize a wireless communication apparatus including a parasitic element-equipped adaptive array antenna capable of increasing the resolution of the variable beam direction of the antenna without increasing the calculation amount in the arithmetic processing unit for optimally controlling the variable phase shifter.

Here, the wireless communication quality level detected by the communication quality detection unit may be a received power level or a packet error rate of the wireless communication apparatus, or a received power level or a packet error rate of another wireless communication apparatus transmitted from the other wireless communication apparatus. With this, the beam direction of the antenna is finely optimized according to the wireless communication quality level.

Advantageous Effects of Invention

According to the adaptive array antenna and the wireless communication apparatus including the adaptive array antenna according to the present invention, it is possible to increase the resolution of the variable beam direction of the antenna without increasing the calculation amount in the arithmetic processing unit for optimally controlling the variable phase shifter.

DESCRIPTION OF EMBODIMENTS

Hereinafter, embodiments of the present invention shall be described with reference to the Drawings.

(Embodiment 1)

Figure 1:
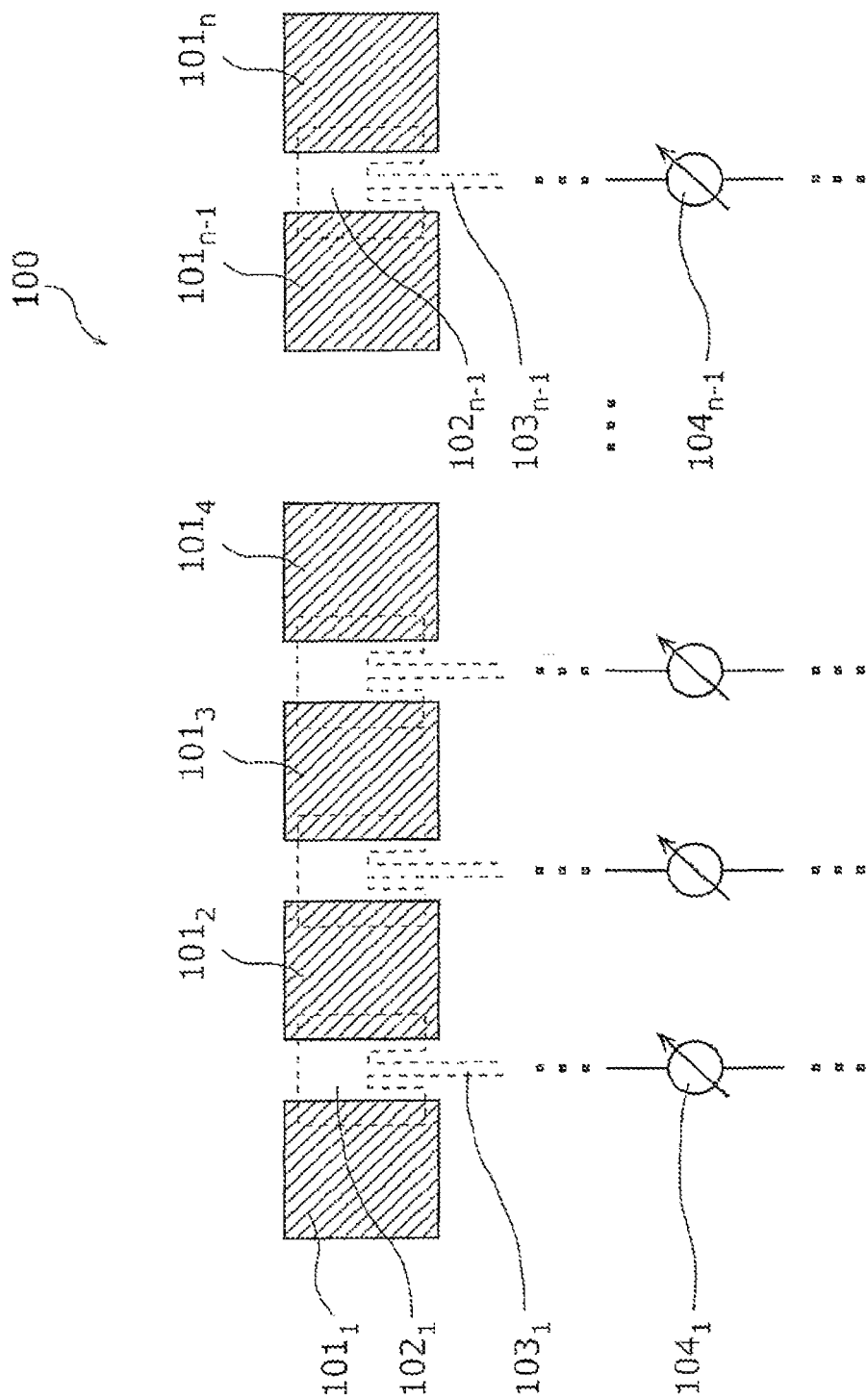
FIG. 1 is a diagram showing a configuration of an n-parasitic element-equipped adaptive array antenna according to Embodiment 1 of the present invention.
Figure 2:
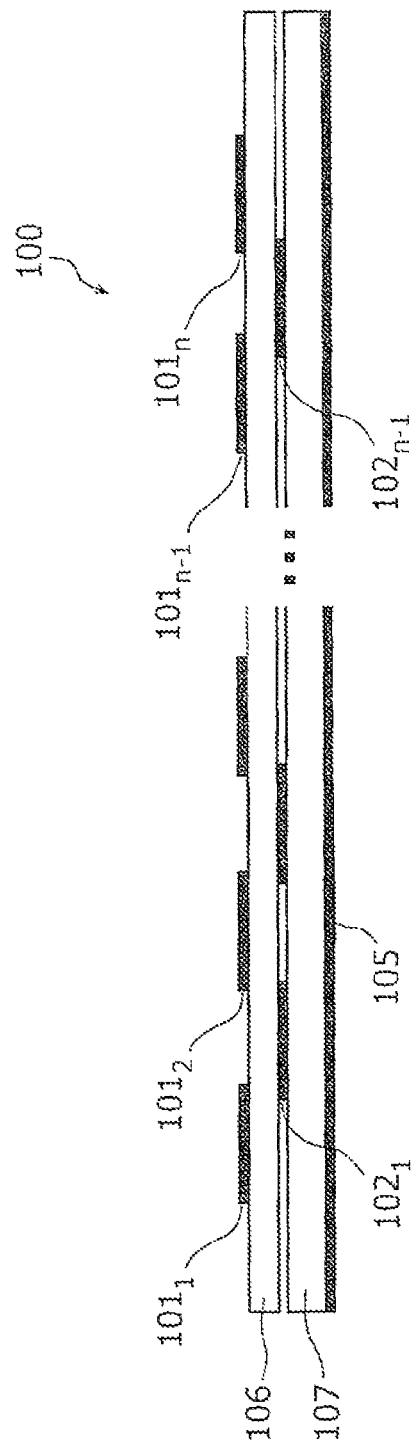
FIG. 2 is a diagram showing a cross-section of the n-parasitic element-equipped adaptive array antenna according to Embodiment 1 of the present invention.

FIG. 1 is a diagram showing a configuration of an n-element (n being an integer equal to or greater than 2) parasitic element-equipped adaptive array antenna according to Embodiment 1 of the present invention, and FIG. 2 is a diagram showing a cross-section of the n-parasitic element-equipped adaptive array antenna according to Embodiment 1 of the present invention.

In FIG. 1 and FIG. 2, an n-parasitic element-equipped adaptive array antenna 100 is an adaptive array antenna that performs digital beam forming electronically, and includes n parasitic antenna elements $101_1$ to $101_n$, (n−1) fed antenna elements $102_1$ to $102_{n-1}$, (n−1) feeder lines $103_1$ to $103_{n-1}$, (n−1) variable phase shifters $104_1$ to $104_{n-1}$, a grounded conductor 105, a first substrate 106, and a second substrate 107. It should be noted that, the feeder lines 103 and the variable phase shifters 104 are not shown in FIG. 2. As can be understood from FIG. 2, the n parasitic antenna elements $101_1$ to $101_n$ are arranged in one row on the same first plane (the top surface of the first substrate 106), and the (n−1) fed antenna elements $102_1$ to $102_{n-1}$ are arranged in one row on a second plane (the top surface of the second substrate 107) which is different from the first plane.

Here, each of the fed antenna elements $102_1$ to $102_{n-1}$ is arranged astride at least two parasitic antenna elements out of the parasitic antenna elements $101_1$ to $101_n$. Specifically, when the n-parasitic element-equipped adaptive array antenna 100 is seen from above the first plane and the second plane (as a planar layout), each of the fed antenna elements $102_1$ to $102_{n-1}$ has regions overlapping with at least two of the parasitic antenna elements. In the present embodiment, each of the fed antenna elements $102_1$ to $102_{n-1}$ overlaps with two parasitic antenna elements. Specifically, each of the fed antenna elements $102_1$ to $102_{n-1}$ is arranged at a position that is equidistant from two parasitic antenna elements.

It should be noted that, in the present embodiment, the fed antenna elements $102_1$ to $102_{n-1}$ and the parasitic antenna elements $101_1$ to $101_n$ have a square outer shape. In addition, the fed antenna elements $102_1$ to $102_{n-1}$ are smaller in size than the parasitic antenna elements $101_1$ to 101. Furthermore, the above-described overlapping regions are regions (two places) of a fed antenna element, which run along the sides of the square and are other than a cut-out region that is connected to a feeder line.

Each of the variable phase shifters $104_1$ to $104_{n-1}$ is connected to a corresponding one of the feeder lines $103_1$ to $103_{n-1}$, and changes, to an appropriate phase, the phase of a radio frequency signal transmitted through the corresponding one of the feeder lines $103_1$ to $103_{n-1}$ and supplied to the corresponding one of the fed antenna elements $102_1$ to $102_{n-1}$.

Each of the feeder lines $103_1$ to $103_{n-1}$ is designed to have characteristic impedance that is in accordance with a wireless communication apparatus (not shown in the figure) to which the n-parasitic element-equipped adaptive array antenna 100 is connected, and feeds (supplies an electrical signal to) the corresponding one of the fed antenna elements $102_1$ to $102_{n-1}$ by being connected to the corresponding one of the fed antenna elements $102_1$ to $102_{n-1}$.

Each of the fed antenna elements $102_1$ to $102_{n-1}$ is provided on the central axis of an inter-element space between the parasitic antenna elements $101_1$ to $101_n$. In other words, each of the fed antenna elements $102_1$ to $102_{n-1}$ is arranged between (on a central axis between) two adjacent parasitic antenna elements out of the parasitic antenna elements $101_1$ to $101_n$. Specifically, in the planar view shown in FIG. 1, the center of a fed antenna element is located at a midpoint which divides in half a line segment connecting the centers of two adjacent parasitic antenna elements. The fed antenna elements $102_1$ to $102_{n-1}$ and the parasitic antenna elements $101_1$ to $101_n$ are coupled by an electromagnetic field. It should be noted that the central axis is an axis in a direction that perpendicularly passes through the plane shown in FIG. 1.

In the n-parasitic element-equipped adaptive array antenna 100, the phases of the electric fields that are excited at the n-system parasitic antenna elements 101 and fed antenna elements 102 are individually changed and radiation pattern of the array antenna is changed by changing the respective phases to be changed by the variable phase shifters $104_1$ to $104_{n-1}$.

In this manner, in the present embodiment, each of the fed antenna elements $102_1$ to $102_{n-1}$ is arranged on the central axis of an inter-element space between two adjacent parasitic antenna elements out of the parasitic antenna elements $101_1$ to $101_n$, so as to be arranged astride at least two parasitic antenna elements. With this, each of the parasitic antenna elements $101_1$ to $101_n$ obtains the electromagnetic field coupling from two fed antenna elements. For example, the parasitic antenna element $101_2$ obtains the electromagnetic field coupling from the two fed antenna elements $102_1$ and $102_2$.

At this time, the composite electric field that is coupled from each of the fed antenna elements $102_1$ to $102_{n-1}$ to each of the parasitic antenna elements $101_2$ to $101_{n-1}$ can be expressed as in Equation 1 below. This composite electric field becomes the source of the excitation electric field of the elements making up the array antenna.

[Math 1]

$$E_{pr} = E_{f1} e^{-j\phi 1} + E_{f2} e^{-j\phi 2} \quad \text{(Equation 1)}$$

In Equation 1, $E_{pr}$ denotes the composite electric field that is coupled from each of the fed antenna elements $102_1$ to $102_{n-1}$ to each of the parasitic antenna elements $101_2$ to $101_{n-1}$. $E_{f1}$ denotes the amplitude component of the electric field that is coupled, to a parasitic antenna element, from one of the two fed antenna elements (for example, the amplitude component of the electric field that is coupled to the parasitic antenna element $101_2$ from the fed antenna element $102_1$), and $E_{f2}$ denotes the amplitude component of the electric field that is coupled, to the parasitic antenna element, from the other of the two fed antenna elements (for example, the amplitude component of the electric field that is coupled to the parasitic antenna element $101_2$ from the fed antenna element $102_2$). Here, $\phi 1$ denotes the phase component of the electric field that is coupled to a parasitic antenna element from one of the two fed antenna elements (for example, the phase component of the electric field that is coupled to the parasitic antenna element $101_2$ from the fed antenna element $102_1$), and $\phi 2$ denotes the phase component of the electric field that is coupled to the parasitic antenna element from the other of the two fed antenna elements (for example, the phase component of the electric field that is coupled to the parasitic antenna element $101_2$ from the fed antenna element $102_2$).

When the amplitude components of the electric fields generated in all of the fed antenna elements $102_1$ to $102_{n-1}$ are the same, Equation 1 can be expressed as in Equation 2 below.

[Math 2]

$$E_{pr} = 2E_f \cos\frac{\phi 1 - \phi 2}{2} e^{-j\frac{\phi 1+\phi 2}{2}} \quad \text{(Equation 2)}$$

In Equation 2, $E_f$ denotes the amplitude component of the electric field that is coupled from the fed antenna elements $102_1$ to $102_{n-1}$ to the parasitic antenna elements $101_2$ to $101_{n-1}$ when $E^{f1}=E_{f2}$. As can be understood from Equation 2, the phase of the composite electric field is expressed by the average of the phases of the coupled electric fields from two adjacent fed antenna elements (two adjacent ones out of the fed antenna elements $102_1$ to $102_{n-1}$). For example, when each of the variable phase shifters $104_1$ to $104_{n-1}$ is 2-bit controlled, and the variable phases are 0 degrees, 45 degrees, 90 degrees, and 135 degrees, the variable phase shifters $104_1$ to $104_{n-1}$ can obtain four types of phases and the angular resolution is 45 degrees.

As in Embodiment 1 of the present invention, when the phases of the electric fields that are excited at the parasitic antenna elements $101_2$ to $101_{n-1}$ are controlled according to the coupling from two of the fed antenna elements $102_1$ to $102_{n-1}$, the types of the phases of the electric fields that are excited at the parasitic antenna elements $101_2$ to $101_{n-1}$ take the average of the phases changed by two variable phase shifters (two out of the variable phase shifters $104_1$ to $104_{n-1}$), and thus there are seven types of phases as in 0 degrees, 22.5 degrees, 45 degrees, 67.5 degrees, 90 degrees, 112.5 degrees, and 135 degrees, and the angular resolution is 22.5 degrees.

In this manner, with the increase of the angular resolution of the phase of the electric fields that are excited at the parasitic antenna elements $101$, the types of the radiation patterns of the array antenna increase and, although the resolution of the main beam direction increases at the time of beam steering, the amount of arithmetic processing for control does not increase because the number of control bits for each of the variable phase shifters $104_1$ to $104_{n-1}$ does not increase.

It should be noted that although an array antenna made up of a linear array (linear arrangement) of n elements is described as an example in Embodiment 1 of the present invention, the element configuration of the parasitic element-equipped adaptive array antenna according to the present invention is not limited to such configuration, and a configuration in which n elements are aligned in a curved line or a bent straight line, for example, is also acceptable. Furthermore, although a planar antenna configured on a substrate is described as an example of the antenna structure, the structure of the parasitic element-equipped adaptive array antenna according to the present invention is not limited to such, and the antenna may be configured by being spread over multiple substrates.

Furthermore, although each of the fed antenna elements $102_1$ to $102_{n-1}$ is arranged on the central axis between elements of the parasitic antenna elements $101_1$ to $101_n$ in Embodiment 1, each parasitic antenna element may be arranged on the central axis between elements of the fed antenna elements, contrary to the above arrangement. In other words, an arrangement in which the fed antenna elements and the parasitic antenna elements are arranged alternately is sufficient.

(Embodiment 2)

Figure 3:
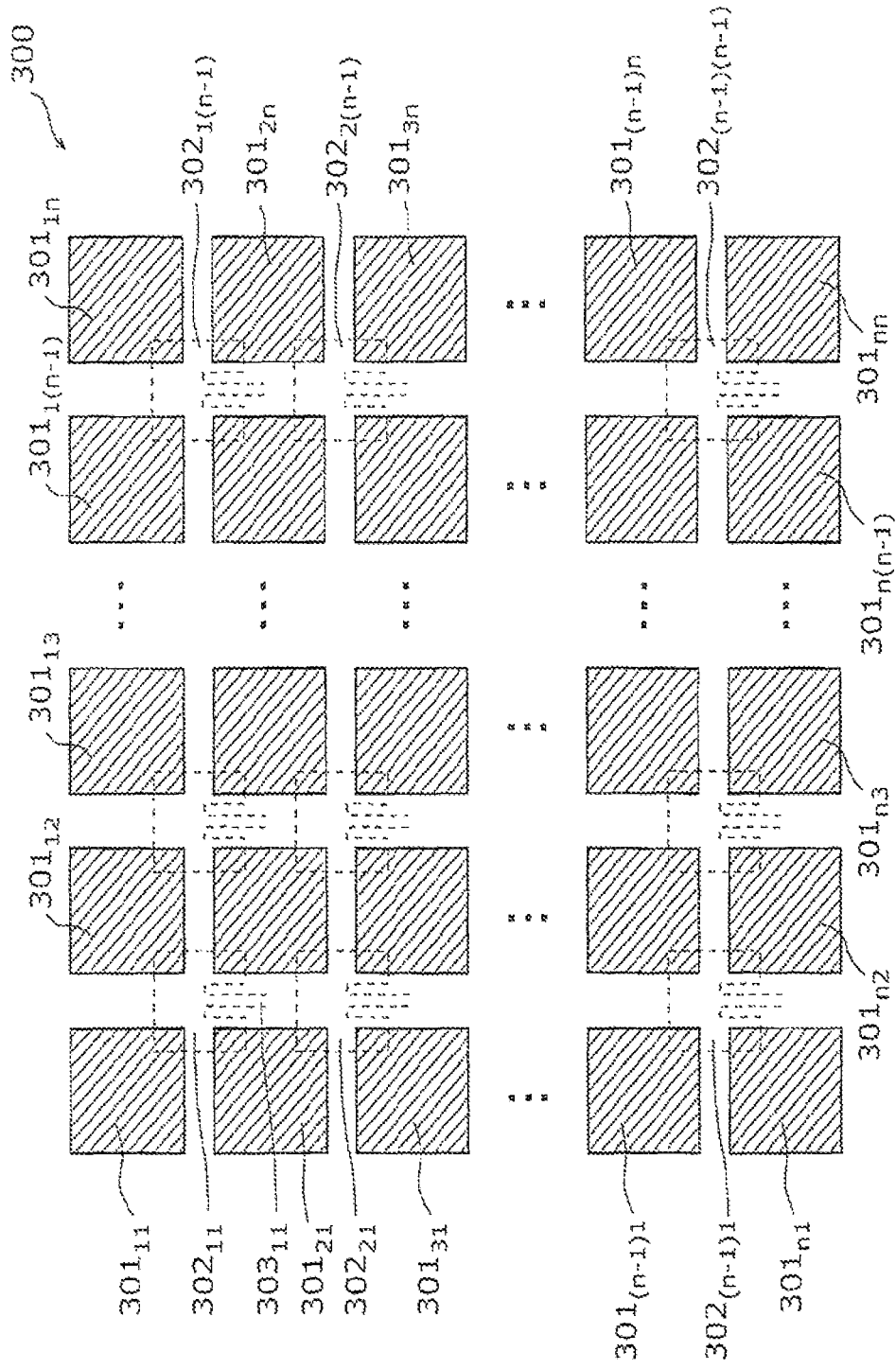
FIG. 3 is a diagram showing an example of a configuration of an n×n-element planar array in an n×n-parasitic element-equipped adaptive array antenna according to Embodiment 2 of the present invention.

A configuration of an n×m-element planar array of an n×m-element (n being an integer equal to or greater than 2, and m being an integer equal to or greater than 2) parasitic element-equipped adaptive array antenna according to Embodiment 2 of the present invention shall be described using FIG. 3. It should be noted that, in Embodiment 2, an n×n-parasitic element-equipped adaptive array antenna shall be described as an example of the n×m-parasitic element-equipped adaptive array antenna. FIG. 3 is a diagram showing an example of a configuration of an n×n-element planar array in an n×n-parasitic element-equipped adaptive array antenna 300 according to Embodiment 2 of the present invention.

Parasitic antenna elements $301_{11}$ to $301_{nn}$, fed antenna elements $302_{11}$ to $302_{(n-1)(n-1)}$, feeder lines $303_{11}$ to $303_{(n-1)(n-1)}$, and variable phase shifters (not shown in the figure) in the n×n-parasitic element-equipped adaptive array antenna 300 according to Embodiment 2 of the present invention are basically the same as the parasitic antenna elements $101_1$ to $101_n$, the fed antenna elements $102_1$ to $102_{n-1}$, the feeder lines $103_1$ to $103_{n-1}$, and the variable phase shifters $104_1$ to $104_{n-1}$ in the n-parasitic element-equipped adaptive array antenna 100 according to Embodiment 1 of the present invention, except that the placement relationship between the parasitic antenna elements $301_{11}$ to $301_{nn}$ and the fed antenna elements $302_{11}$ to $302_{(n-1)(n-1)}$ is different from that in the n-parasitic element-equipped adaptive array antenna 100 according to Embodiment 1 of the present invention.

Therefore, a planar antenna configured on a substrate as shown in FIG. 2 can be given as an example of the structure of the n×n-parasitic element-equipped adaptive array antenna 300 according to Embodiment 2 of the present invention.

In the present embodiment, as in Embodiment 1, each of the fed antenna elements $302_{11}$ to $302_{(n-1)(n-1)}$ is arranged astride at least two (here, four) parasitic antenna elements out of the parasitic antenna elements $301_{11}$ to $301_{nn}$. Specifically, when the n×n-parasitic element-equipped adaptive array antenna 300 is seen from above the previously described first plane and second plane (as a planar layout), each of the fed antenna elements $302_{11}$ to $302_{(n-1)(n-1)}$ has regions overlapping with at least two (here, four) of the parasitic antenna elements. In the present embodiment, each of the fed antenna elements $302_{11}$ to $302_{(n-1)(n-1)}$ overlaps with four adjacent parasitic antenna elements. Specifically, each of the fed antenna elements $302_{11}$ to $302_{(n-1)(n-1)}$ is arranged at a position that is equidistant from four adjacent parasitic antenna elements. Therefore, in the present embodiment, the overlapping regions in one fed antenna element are located in the corners (four places) of the square.

More specifically, in FIG. 3, each of the fed antenna elements $302_{11}$ to $302_{(n-1)(n-1)}$ is arranged at a position that is at the center of four adjacent parasitic antenna elements out of the parasitic antenna elements $301_{11}$ to $301_{nn}$, that is, on the axis which is the cross point (on the lattice diagonal cross point axis) of the respective parasitic antenna elements $301_{11}$ to $301_{nn}$. In other words, in the planar view shown in FIG. 3, the center of the fed antenna element is located at the cross point of two diagonal lines connecting the centers of four adjacent parasitic antenna elements. With this, each of the parasitic antenna elements $301_{11}$ to $301_{nn}$ (strictly speaking, except the parasitic antenna elements in the periphery of the two-dimensional arrangement) can obtain the electromagnetic field coupling from four fed antenna elements. It should be noted that the lattice diagonal cross point axis is an axis in a direction that perpendicularly passes through the plane shown in FIG. 3.

In the same manner as in the case of the linear array of the n-parasitic element-equipped adaptive array antenna according to Embodiment 1 of the present invention described previously, when the respective parasitic antenna elements $301_{11}$ to $301_{nn}$ (strictly speaking, except the parasitic antenna elements in the periphery of the two-dimensional arrangement)

equally obtain an electric field coupling from four fed antenna elements, the phase of the composite electric field is the average of the phases of the electric fields from the four fed antenna elements.

Through such a configuration, Embodiment 2 of the present invention makes it possible to further increase the angular resolution of the excitation phase of the n-parasitic element-equipped adaptive array antenna 100 according to Embodiment 2 of the present invention.

It should be noted that although an array antenna made up of a planar array of n×n elements is described as an example in Embodiment 2 of the present invention, the number of elements of the parasitic element-equipped adaptive array antenna according to the present invention is not limited to such number, and an array antenna configured of a planar array of n×m elements (m being an integer equal to or greater than 2, and m≠n), for example, is also acceptable. Furthermore, although a planar antenna configured on a substrate is described as an example of the antenna structure, the structure of the parasitic element-equipped adaptive array antenna according to the present invention is not limited to such, and the antenna may be configured by being spread over multiple substrates.

(Embodiment 3)

Figure 4:
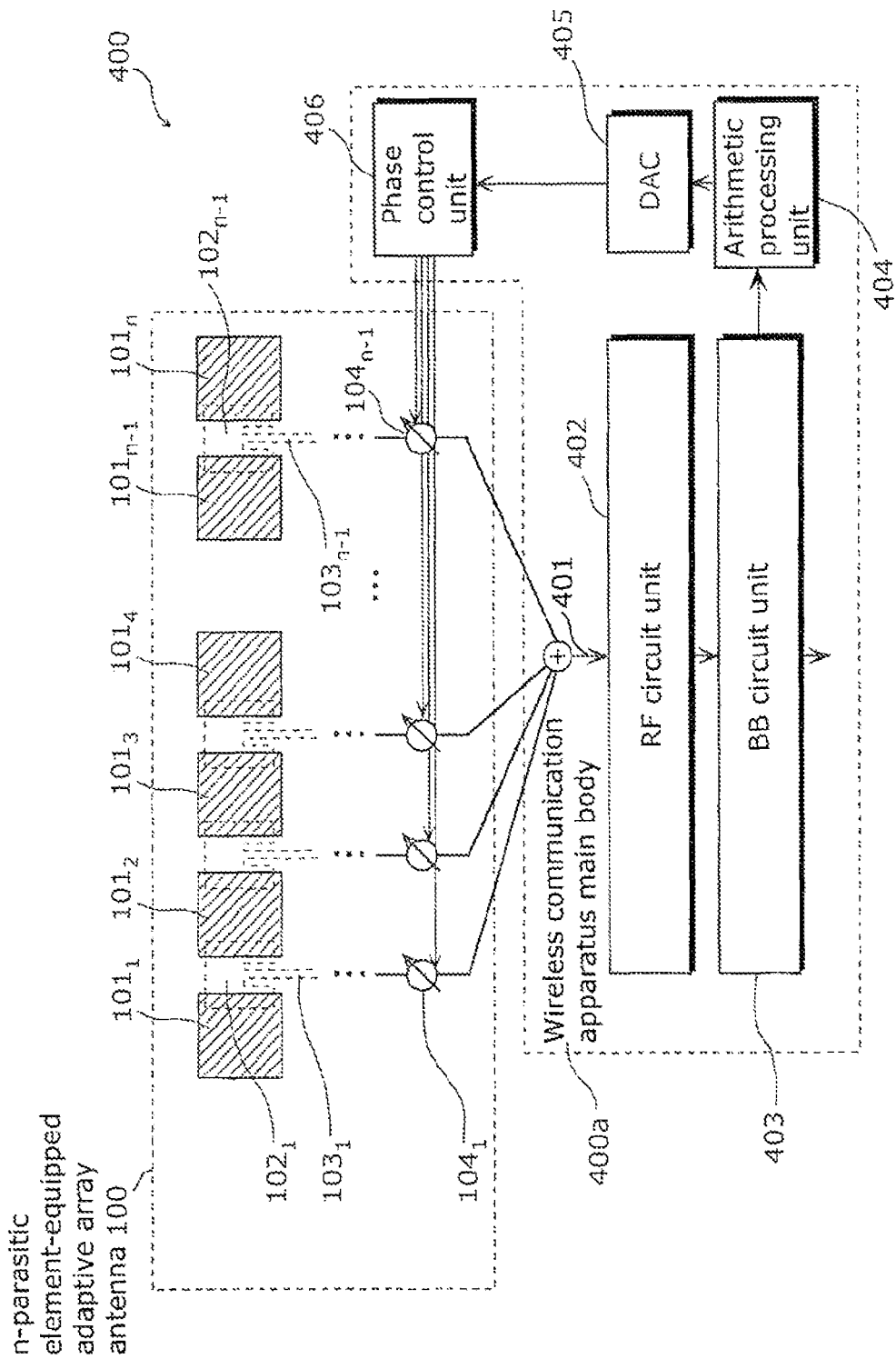
FIG. 4 is a block diagram showing the configuration of a wireless communication apparatus which includes an n-parasitic element-equipped adaptive array antenna, in Embodiment 3 of the present invention.
Figure 5:
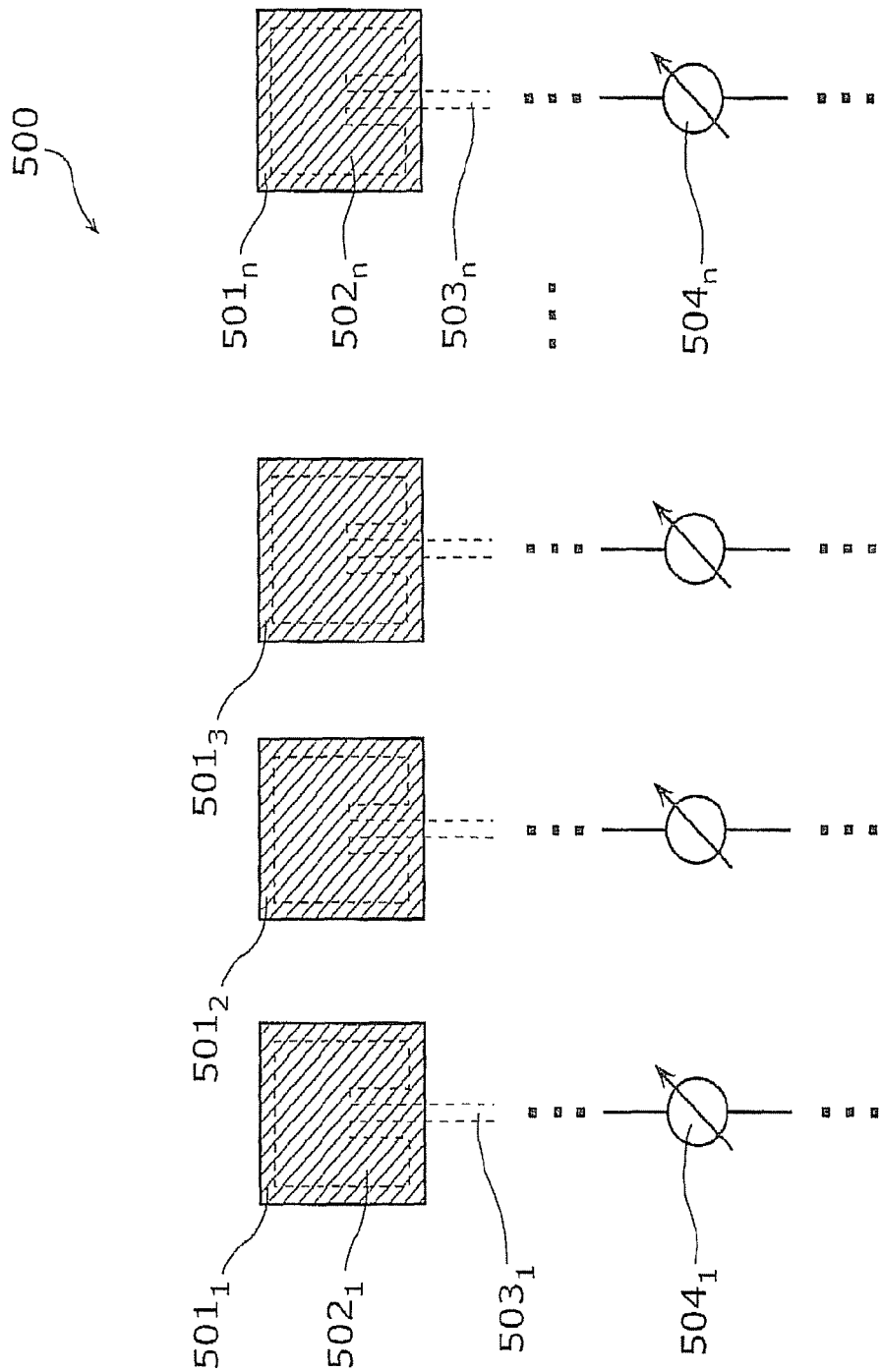
FIG. 5 is a diagram showing the configuration of a conventional, typical n-parasitic element-equipped adaptive array antenna.

A configuration of a wireless communication apparatus 400 including the n-parasitic element-equipped adaptive array antenna 100, in Embodiment 3 of the present invention shall be described using FIG. 4. It should be noted that FIG. 4 is a block diagram showing the configuration of the wireless communication apparatus 400 which includes the n-parasitic element-equipped adaptive array antenna 100 and a wireless communication apparatus main body 400*a*, in Embodiment 3 of the present invention.

In FIG. 4, the n-parasitic element-equipped adaptive array antenna 100 is the same as the n-parasitic element-equipped adaptive array antenna 100 in Embodiment 1 shown in FIG. 1 and FIG. 2, and thus the same reference signs are assigned to the respective constituent elements and their detailed description shall not be repeated here.

The wireless communication apparatus 400 includes the n-parasitic element-equipped adaptive array antenna 100 and a wireless communication apparatus main body 400*a* which functions as a wireless receiving apparatus including a radio frequency (RF) circuit unit 402, a base band (BB) circuit unit 403, an arithmetic processing unit 404, a digital-to-analog converter (DAC) 405, and a phase control unit 406.

Here, the relationship between the respective constituent elements in the Claims and the respective constituent elements shown in FIG. 4 is described as follows: the communication quality detection unit in the Claims corresponds to the BB circuit unit 403 shown in FIG. 4; the arithmetic processing unit in the Claims includes the arithmetic processing unit 404 and the DAC 405 shown in FIG. 4; and the phase control unit in the Claims corresponds to the phase control unit 406 shown in FIG. 4.

In the same manner as in Embodiment 1 of the present invention, each of the fed antenna elements $102_1$ to $102_{n-1}$ is arranged on the central axis between elements of the parasitic antenna elements $101_1$ to $101_n$. Each of the variable phase shifters $104_1$ to $104_{n-1}$ is connected to a corresponding one the fed antenna elements $102_1$ to $102_{n-1}$ via a corresponding one of the feeder lines $103_1$ to $103_{n-1}$. A combiner 401 is connected to the variable phase shifters $104_1$ to $104_{n-1}$, and RF signals are combined by the combiner 401.

The signal outputted from the combiner 401 is inputted to the radio frequency (RF) circuit unit 402 which handles radio frequency signals. After processing in the RF band is performed, the signal is sent to the base band (BB) circuit unit 403 and signal forming processing such as modulation and demodulation is performed.

The BB circuit unit 403 includes a circuit which measures received power according to received signal strength indication (RSSI), or signal quality (wireless communication quality) according to packet error rate (PER), and the like, and the measurement result is sent to the arithmetic processing unit 404.

The arithmetic processing unit 404 performs optimization calculations, with the phase control signals for controlling the variable phase shifters $104_1$ to $104_{n-1}$ as variables, and determines the phase control signals based on the calculation result, so that the received power or PER, and the like, sent from the BB circuit unit 403 is at a level suitable for wireless communication, that is, so that the wireless communication quality becomes optimal. For example, the arithmetic processing unit 404 calculates the wireless communication quality for each of the possible combinations of the phases to be changed by the variable phase shifters $104_1$ to $104_{n-1}$, and identifies the combination of the phases to be changed by the variable phase shifters $104_1$ to $104_{n-1}$ that will give the best wireless communication quality.

The phase control signals that are determined by the arithmetic processing unit 404 are sent to the phase control unit 406 after D/A conversion by the DAC 405. The phase control unit 406 transmits the phase control signals received from the DAC 405 to the respective the variable phase shifters $104_1$ to $104_{n-1}$ to control the respective phases to be changed by the variable phase shifters $104_1$ to $104_{n-1}$.

In the above-described processing, when the control coefficients such as the number of phase bits (number of control bits) and so on increase, the volume of calculation at the arithmetic processing unit 404 increases, and thus determining the phase control signal takes time. However, as shown in Embodiment 3 of the present invention, the increase of control coefficients can be suppressed by arranging the respective parasitic antenna elements $101_1$ to $101_n$ on the central axis between the elements of the fed antenna elements $102_1$ to $102_{n-1}$.

It should be noted that although the case where the wireless communication apparatus 400 is a wireless receiving apparatus is described as an example in Embodiment 3 of the present invention, it is clear that the same advantageous effect is produced even when the wireless communication apparatus 400 is a wireless transmission apparatus. However, when the wireless communication apparatus 400 is a wireless transmission apparatus, the combiner 401 must operate as a divider, and it is necessary to receive information regarding the received power or PER of a wireless receiving apparatus, that is, information regarding wireless communication quality, from the wireless receiving apparatus, and determine the phase control signals by calculating, through the arithmetic processing unit 404, such that the received power or PER of the wireless receiving apparatus is at an optimum level suitable for wireless communication.

Specifically, the wireless communication quality level detected by the communication quality detection unit included in the wireless communication apparatus according to the present invention may be the received power level or packet error rate of the wireless communication apparatus or the received power level or packet error rate of another wireless communication apparatus transmitted from the other wireless communication apparatus. With this, the beam direction of the antenna is finely optimized according to the wireless communication quality level.

Furthermore, although a wireless communication apparatus including the n-parasitic element-equipped adaptive array antenna 100 according to Embodiment 1 of the present invention is described as an example in Embodiment 3 of the present invention, the wireless communication apparatus according to the present invention is not limited to such, and may be, for example, a wireless communication apparatus including the n×n-parasitic element-equipped adaptive array antenna 300 according to Embodiment 2 of the present invention.

Although the adaptive array antenna and the wireless communication apparatus including the adaptive array antenna are described based on Embodiments 1 to 3 up to this point, the present invention is not limited to such embodiments. The present invention includes those forms obtainable through various modifications to the respective embodiments and forms realized by arbitrarily combining the constituent elements of the respective embodiments that may be conceived by a person of ordinary skill in the art that do not depart from the essence of the present invention.

Furthermore, the present invention is not limited to the above-described embodiments with regard to the number, shape, size, and location of the overlapping regions of the fed antenna elements and parasitic antenna elements. A structure in which at least one fed antenna element is electromagnetically coupled to multiple parasitic antenna elements is sufficient to enable an increase in the resolution of the variable beam direction of the adaptive array antenna.

INDUSTRIAL APPLICABILITY

The present invention is useful as an adaptive array antenna and a wireless communication apparatus including the adaptive array antenna, and particularly as a parasitic element-equipped adaptive array antenna used in fields such as radio frequency wireless communication in microwave band and millimeter waveband and a wireless communication apparatus including the same.

REFERENCE SIGNS LIST

| | |
|---|---|
| 100 | n-parasitic element-equipped adaptive array antenna |
| $101_1$ to $101_n$ | Parasitic antenna elements |
| $102_1$ to $102_{n-1}$ | Fed antenna elements |
| $103_1$ to $103_{n-1}$ | Feeder lines |
| $104_1$ to $104_{n-1}$ | Variable phase shifters |
| 105 | Grounded conductor |
| 106 | First substrate |
| 107 | Second substrate |
| 300 | n-parasitic element-equipped adaptive array antenna |
| $301_{11}$ to $301_{nn}$ | Parasitic antenna elements |
| $302_{11}$ to $302_{(n-1)(n-1)}$ | Fed antenna elements |
| $303_{11}$ to $303_{(n-1)(n-1)}$ | Feeder lines |
| 400 | Wireless communication apparatus including an n-parasitic element-equipped adaptive array antenna |
| 400a | Wireless communication apparatus main body |
| 401 | Combiner |
| 402 | RF circuit unit |
| 403 | BB circuit unit |
| 404 | Arithmetic processing unit |
| 405 | DAC |
| 406 | Phase control unit |
| 500 | Conventional typical n-parasitic element-equipped adaptive array antenna |
| $501_1$ to $501_n$ | Parasitic antenna elements |
| $502_1$ to $502_n$ | Fed antenna elements |
| $503_1$ to $503_n$ | Feeder lines |
| $504_1$ to $504_n$ | Variable phase shifters |

The invention claimed is:

1. An adaptive array antenna comprising:
at least one variable phase shifter which changes a phase of an electrical signal;
a plurality of parasitic antenna elements;
a plurality of fed antenna elements each of which (i) is arranged astride at least two parasitic antenna elements out of said plurality of parasitic antenna elements, (ii) is coupled with said at least two parasitic antenna elements by an electromagnetic field, (iii) receives a supply of the electrical signal phase-changed by said at least one variable phase shifter and (iv) transmits, to said at least two parasitic antenna elements, an electric field generated based on the supplied electrical signal;
n parasitic antenna elements as said parasitic antenna elements, n being an integer equal to or greater than 2;
(n−1) fed antenna elements as said fed antenna elements; and
(n−1) variable phase shifters as said at least one variable phase shifter, said (n−1) variable phase shifters being provided to correspond one-to-one to said (n−1) fed antenna elements, and each of said (n−1) variable phase shifters changing a phase of a radio frequency signal supplied to the corresponding one of said (n−1) fed antenna elements,
wherein each of said (n−1) fed antenna elements is arranged astride two adjacent parasitic antenna elements out of said n parasitic antenna elements.

2. An adaptive array antenna comprising:
at least one variable phase shifter which changes a phase of an electrical signal;
a plurality of parasitic antenna elements;
a plurality of fed antenna elements each of which (i) is arranged astride at least two parasitic antenna elements out of said plurality of parasitic antenna elements, (ii) is coupled with said at least two parasitic antenna elements by an electromagnetic field, (iii) receives a supply of the electrical signal phase-changed by said at least one variable phase shifter and (iv) transmits, to said at least two parasitic antenna elements, an electric field generated based on the supplied electrical signal;
n×m parasitic antenna elements as said parasitic antenna elements, n being an integer equal to or greater than 2, and m being an integer equal to or greater than 2;
(n−1)×(m−1) fed antenna elements as said fed antenna elements; and
(n−1)×(m−1) variable phase shifters as said at least one variable phase shifter, said (n−1)×(m−1) variable phase shifters being provided to correspond one-to-one to said (n−1)×(m−1) fed antenna elements, and each of said (n−1)×(m−1) variable phase shifters changing a phase of a radio frequency signal supplied to the corresponding one of said (n−1)×(m−1) fed antenna elements,
wherein each of said (n−1)×(m−1) fed antenna elements is arranged astride four adjacent parasitic antenna elements out of said n×m parasitic antenna elements.

* * * * *